US008914454B1

(12) United States Patent
Kroleski

(10) Patent No.: US 8,914,454 B1
(45) Date of Patent: Dec. 16, 2014

(54) VERIFICATION OF SOCIAL MEDIA DATA

(71) Applicant: Hearsay Social, Inc., San Francisco, CA (US)

(72) Inventor: Gregory Kroleski, San Francisco, CA (US)

(73) Assignee: Hearsay Social, Inc., San Francisco, CA (US)

( * ) Notice: Subject to any disclaimer, the term of this patent is extended or adjusted under 35 U.S.C. 154(b) by 177 days.

(21) Appl. No.: 13/646,534

(22) Filed: Oct. 5, 2012

(51) Int. Cl.
*G06F 15/173* (2006.01)
*H04L 29/08* (2006.01)

(52) U.S. Cl.
CPC .................................... *H04L 67/32* (2013.01)
USPC ............ 709/206; 709/203; 709/217; 709/223

(58) Field of Classification Search
USPC .................. 709/203, 206, 217, 219, 223, 224
See application file for complete search history.

(56) References Cited

U.S. PATENT DOCUMENTS

| | | | | |
|---|---|---|---|---|
| 2012/0331391 | A1* | 12/2012 | Kanjirathinkal et al. | 715/738 |
| 2013/0151616 | A1* | 6/2013 | Amsterdamski | 709/204 |
| 2013/0218806 | A1* | 8/2013 | Daly | 705/36 R |
| 2013/0304568 | A1* | 11/2013 | Hunt et al. | 705/14.44 |
| 2014/0107939 | A1* | 4/2014 | Jaunakais et al. | 702/22 |
| 2014/0164398 | A1* | 6/2014 | Smith et al. | 707/748 |

FOREIGN PATENT DOCUMENTS

CA WO2014040179 * 3/2014

* cited by examiner

*Primary Examiner* — Lashonda Jacobs
(74) *Attorney, Agent, or Firm* — Van Pelt, Yi & James LLP

(57) ABSTRACT

Information verification includes: presenting, to a plurality of independent verifiers, a verification task associated with a social media item obtained from a social media-based platform, the verification task being associated with an expected result; receiving, from the plurality of independent verifiers, a plurality of responses in response to the verification task; determining, using one or more computer processors, a verification result based at least in part on the plurality of responses; determining whether there is a disagreement between the verification result and the expected result; and in the event that there is a disagreement between the verification result and the expected result, performing an action in response to the disagreement.

21 Claims, 3 Drawing Sheets

VERIFICATION OF SOCIAL MEDIA DATA

BACKGROUND OF THE INVENTION

Social media has become an important way for online users to connect with each other, create content, and exchange information. As social media sites such as Facebook®, Twitter®, LinkedIn®, etc. become more popular, many companies are becoming interested in leveraging social media information for business purposes. For example, Hearsay Social™ provides an enterprise social media platform that aggregates content generated on various social media sites and uses the content for sales and marketing purposes.

A large amount of data is constantly generated on social media sites and is ever-changing. New content can be added, existing content can be modified, and old content can be removed. The aggregated content should accurately reflect the additions, modifications, and deletions of content. Given the large amount of data that is constantly generated on the social media sites, however, verification of the aggregated content has become a challenging task. It can be expensive to implement and maintain special software designed for the purpose of data verification. Further, any defects in the software logic can still lead to incorrect results.

BRIEF DESCRIPTION OF THE DRAWINGS

Various embodiments of the invention are disclosed in the following detailed description and the accompanying drawings.

DETAILED DESCRIPTION

Figure 1:
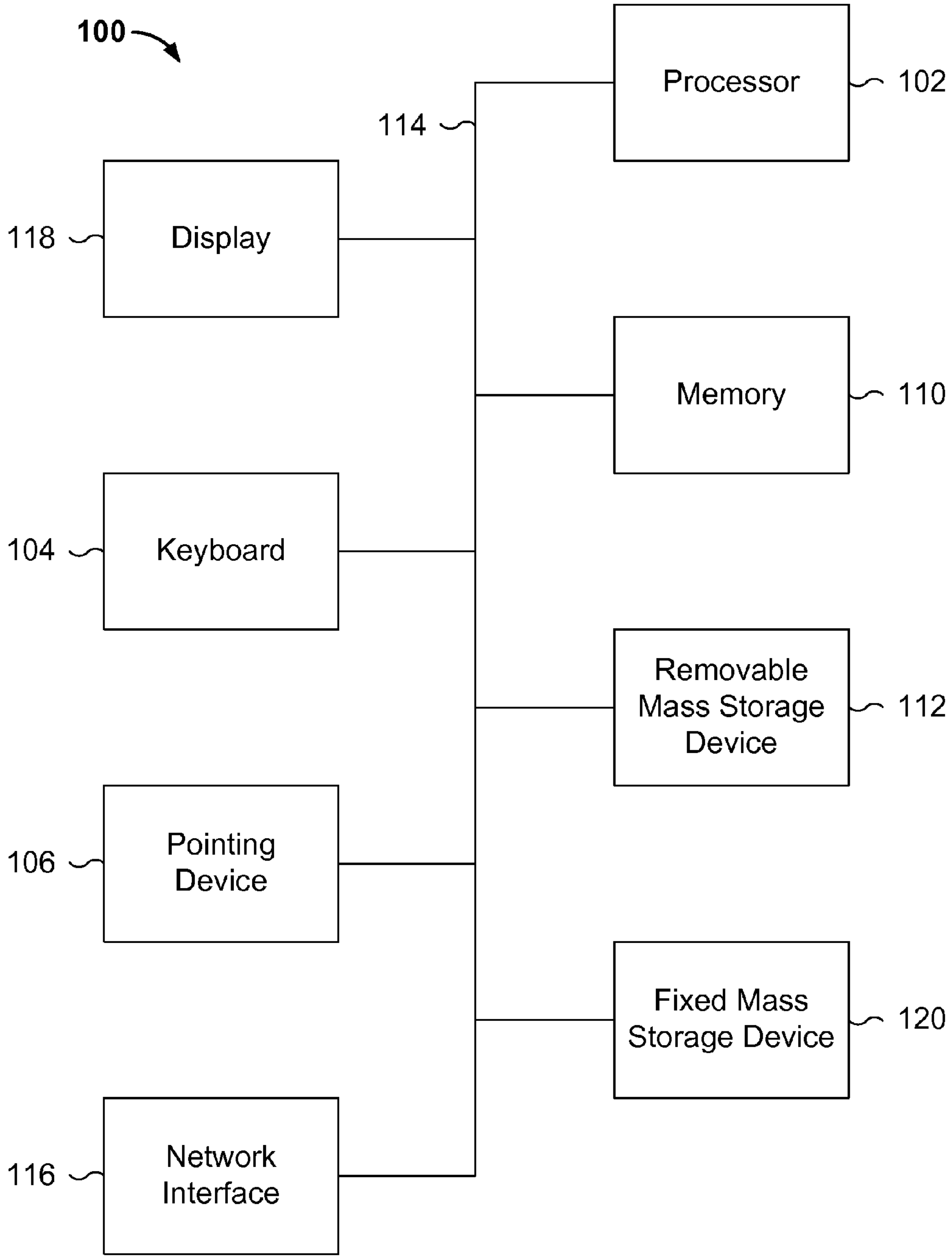
FIG. 1 is a functional diagram illustrating a programmed computer system for providing crowd-sourced data verification in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Verification of social media items collected from social media sites is disclosed. As used herein, a social media site refers to a website, a portal, or any other appropriate destination that is reachable by users over a network such as the Internet, and that allows users to generate content via their client terminals (e.g., personal computers, mobile devices, etc.) to be displayed on the social media site, and to interact with other users. Examples of social media sites include Facebook®, Twitter®, LinkedIn®, etc. A social media item refers to a piece of content received from a social media site, such as a page or a posting from Facebook®, a tweet from Twitter®, a profile or a topic from LinkedIn®, etc. In some embodiments, the verification technique employs a crowd sourcing model where a number of independent human users (also referred to as verifiers) are presented with verification tasks such as questions about certain social media items. The verifiers perform each verification task independently and submit their answers. In some embodiments, a verification result is determined based on the verifiers' answers. In some embodiments, the verifiers' result is compared with an expected result. Any disagreement between the verification result and the expected result is identified. In the event that there is a disagreement, an action is taken in response to the disagreement.

FIG. 1 is a functional diagram illustrating a programmed computer system for providing crowd-sourced social networking data verification in accordance with some embodiments. As will be apparent, other computer system architectures and configurations can be used to perform verification of social networking data. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to implement the enterprise social media management platform described below, and/or executes/performs the processes described below with respect to FIG. 3.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer readable media such as magnetic tape, flash memory, PC-CARDS, portable mass storage devices, holographic storage devices, and other storage devices. A fixed mass storage device 120 can also, for example, provide additional data storage capacity. The most common example of mass storage 120 is a hard disk drive. Mass storage 112 and 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer readable medium is any data storage device that can store data which can thereafter be read by a computer system. Examples of computer readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
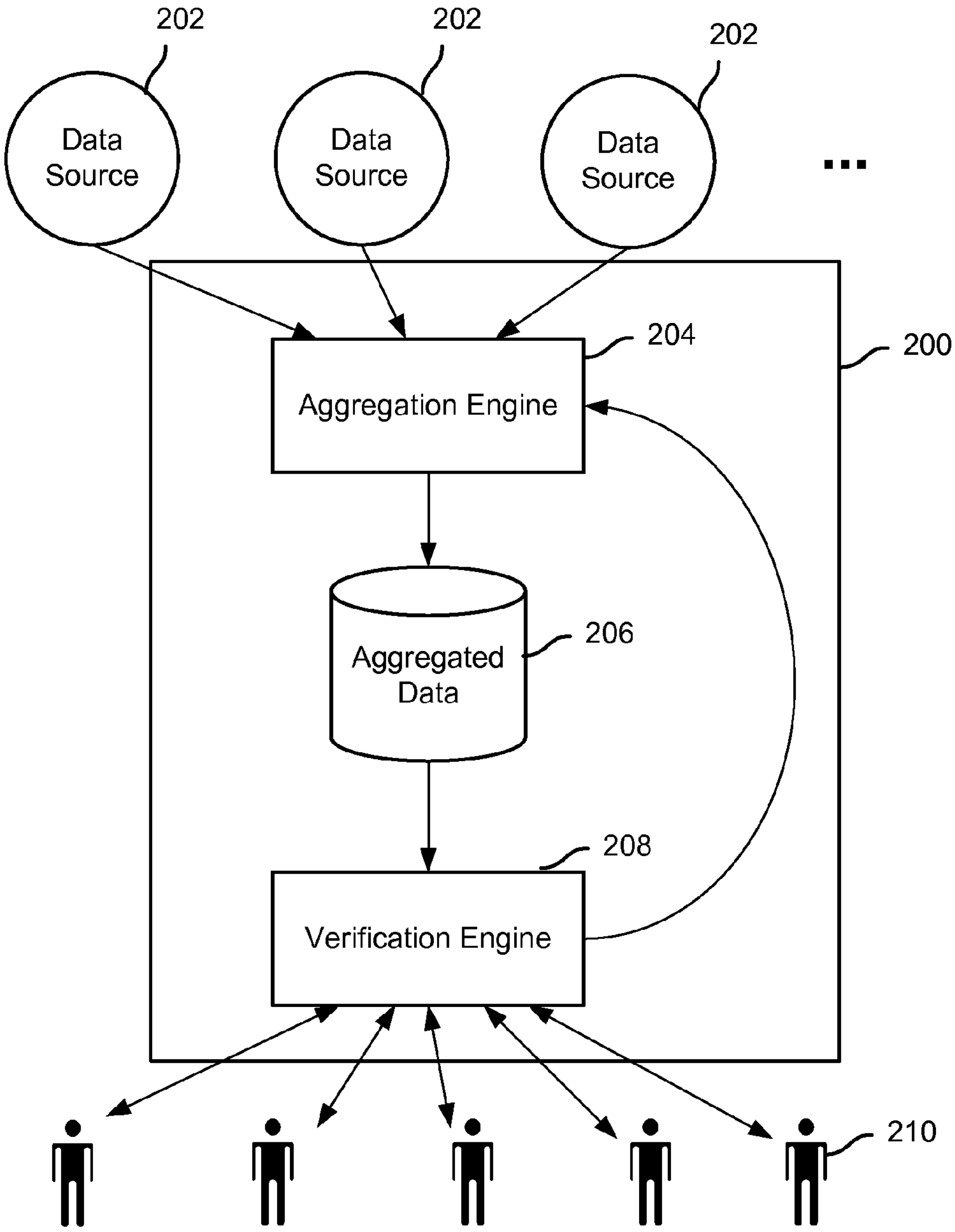
FIG. 2 is a block diagram illustrating an embodiment of a verification system for social media content.

FIG. 2 is a block diagram illustrating an embodiment of a verification system for social media content. In this example, a social media aggregation platform 200 is used to provide customers with sales and marketing information and tools based on data gathered by one or more data sources 202, which include one or more social media websites such as Facebook®, Twitter®, LinkedIn®, Yelp®, etc. Platform 200 includes an aggregation engine 204, a data store 206, and a verification engine 208.

In the embodiment shown, aggregation engine 204 receives data from data sources 202 via a network, such as the Internet. In some embodiments, the aggregation engine implements a crawler using application programming interfaces (APIs) provided by the social media websites. For example, the Facebook® Graph API is used to get a posting and its associated comments by a particular user. The crawler periodically accesses the social media websites to download social media items of interest to platform 200, such as postings generated by employees and agents of customers to platform 200, pages that mention the customers by name, etc.

In the example shown, data obtained by the aggregation engine 204 is optionally processed and stored in a data store 206. The data store can be implemented as a relational database, an object database, a set of files, a set of tables, or any other appropriate data structures. Examples of social media items stored in aggregated data store 206 include Facebook® postings and/or pages, Twitter® feeds, LinkedIn® profiles and/or discussions, Yelp® reviews, etc. In most cases, an item has an associated link such as a universal resource locator (URL).

Verification engine 208 obtains sample social media items from data store 206 and generates verification tasks associated with the items (e.g., questions pertaining to the items). The verification tasks are presented to a number of independent verifiers 210. In some embodiments, the verification engine and/or a separate web server presents the verification tasks to the verifiers via applications executing on client devices, such as web browsers or standalone client applications operating on laptops, desktops, tablets, smartphones, or the like. In some embodiments, the verification engine keeps track of how many verification tasks are completed by each verifier and makes small payments (e.g., cash, points or credits towards purchases, etc.) to the verifiers for their efforts in completing the verification tasks.

In some embodiments, existing crowdsourcing tools such as Amazon®'s Mechanical Turk™ (MTurk) can be used to implement portions of the verification engine, such as the logic for presenting the tasks, gathering responses, maintaining user accounts for the verifiers, and keeping track of payments to the verifiers. Additional intelligence is added to the existing tools to expand their capabilities and create new tools that better suit the verification needs of the social media aggregation platform.

As will be described in greater detail below, for a verification task, the verification result obtained from the verifiers' responses is compared with an expected answer. In the event that the verification result does not match the expected answer, one or more appropriate actions such as logging the verification result, reloading the social media item, and/or recording information for statistical analysis are performed. In some embodiments, feedback is provided to the aggregation engine.

Figure 3:
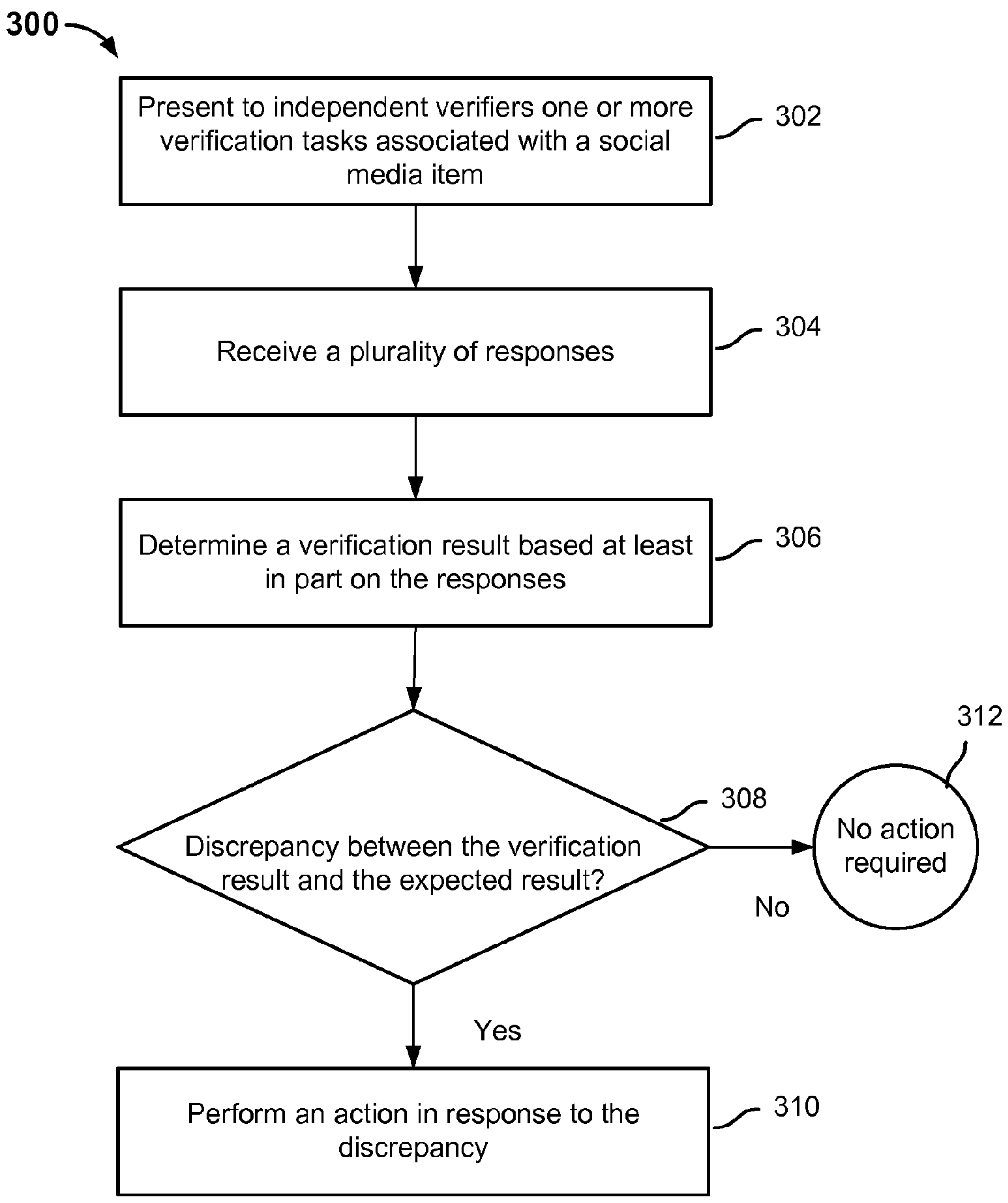
FIG. 3 is a flowchart illustrating an embodiment of a process to verify a social media item.

FIG. 3 is a flowchart illustrating an embodiment of a process to verify a social media item. Process 300 can be executed on a system such as 200.

At 302, one or more verification tasks associated with a social media item are presented to a plurality of independent verifiers (preferably an odd number of verifiers). The social media item, which was originally published on a social media site and harvested by the aggregation engine, is obtained from an aggregated data store such as 206, or directly from the aggregation engine. In some embodiments, the verification tasks include questions based on certain objective aspects of the items that would result in definitive answers (e.g., an objective question such as "does this posting have a picture?" rather than a subjective question such as "is this posting interesting?") In some embodiments, the questions are presented with a link (e.g., a selectable URL) associated with the social media item, so that the verifier can click on the link and make observations about the social media item. The questions are designed to be simple for a human user to answer. Preferably, the answers to the questions can also be obtained programmatically using software code (e.g., by making a database query of a social media item, invoking a call to a data structure, etc.). As described in greater detail below, the human-provided answers are used to provide checks and feedbacks to the aggregation engine to ensure that the data in the system is accurate.

In various embodiments, the types of questions include: whether the social media item is still present at the social media site where it was originally published (e.g., can the verifiers click on the URL and still see a posting), whether there are related actions associated with the social media item (e.g., whether other users have made comments on, indicated "like" with respect to, or shared a Facebook® posting, whether a Tweet on Twitter® has been re-tweeted, etc.), determining a count associated with the social media item (e.g., how many comments or "likes" there are with respect to a Facebook® posting or how many times a Tweet on Twitter® has been re-tweeted), and providing a date or time associated with the related actions (e.g., when was the last time a LinkedIn® profile was updated). Other appropriate question types relating to social media items can be used. The question-answer sets can be presented in various forms, including: true or false; multiple-choice; and request for a number, a date/time, and/or some text.

At 304, responses from the verifiers are received. In some embodiments, the responses are received via user interfaces provided by the crowd sourcing tool, and the time at which each verifier provided the response is recorded.

At 306, a verification result is determined based at least in part on the responses. In some embodiments, the responses are compared and the response given by the highest number of verifiers is deemed to be the verification result. For example, if the question is for how many comments a Facebook® post has received, and three out of five verifiers indicate that two comments are received while the other two verifiers indicate that there is only one comment, then the result is two comments. In some embodiments, in the event that multiple responses of different results have the same number of replies, additional verification (e.g., manual selection by an administrator) will be required. If there is no answer that is agreed upon by the majority of replies the verification is deemed to be invalid and the process terminates for this social media item.

At 308, the verification result is compared with an expected result (also referred to as a predetermined answer), and any disagreement between the two results is determined. In some embodiments, the verification engine includes logic that processes the social media item to generate the expected result. For example, in response to a question of how many follow-on comments a particular item (e.g., a Facebook® posting, a Twitter® tweet, a Yelp® review, etc.) has received, the verification engine invokes code that makes a query to the data store, which looks up the item and its follow-on comments in accordance with the format in which information pertaining to the item is stored, and determines the number of comments as the expected result. The expected result is not provided to the verifiers.

The lack of any disagreement between the verification result and the expected result indicates that the data on platform 200 is likely to be correct and up-to-date. Therefore, as indicated by 312, no further action is required with respect to the social media item. If, however, there is a disagreement (e.g., the verification result indicates that there are three comments but the expected result is two comments), then, at 310, an appropriate action is performed in response to the disagreement. In some embodiments, the action includes reloading the social media item from its source to ensure that the latest data is available to the aggregation engine. In some embodiments, the action includes storing information about the disagreement in the log file or a data store, analyzing the disagreement information, generating a report so that an administrator or programmer can investigate further, and/or generating a statistical model to provide feedback to the aggregation engine. Other appropriate actions can be taken.

In some embodiments, process 300 is executed on samples of social media items obtained from the database. For example, 1000 sample items are randomly selected every day from the database to be verified by the verifiers, and the verification results are compared with expected results. Specifically, it is determined whether there is a statistically significant rate of disagreements between the verification results and the expected results. As used herein, the rate of disagreements can refer to the number of disagreements, a ratio of disagreements to total number of sample items, the difference between a value associated with the verification result and same value associated with the expected result (e.g., the verifiers report that in response to the 1000 sample items, there are 8000 comments total; however, the expected result directly obtained from the database reports that there are 5000 comments in response to the 1000 samples), or any other appropriate measure.

In some embodiments, to determine whether the rate is statistically significant, a pre-determined threshold or p-value (e.g., 0.05) is selected to measure the probability that the result was caused by chance or any form of selection bias. The expected results directly obtained from the database are compared to the verification results to determine the p-value by using an appropriate test that fits the distribution of the sample items. Examples of the test include a T-test or a Chi-Square test. If the resulting p-value is lower than the pre-selected threshold, it is determined that the disagreement was not caused by chance but rather by some error (e.g., a problem associated with the crawler) that needs to be further investigated.

Different types of questions can be used to provide different types of feedback information. In some embodiments, the verification is used to verify the quality of the crawler. For example, the verification question may include a timestamp associated with the time at which the expected result is generated. For instance, suppose a social media item is obtained by the crawler at 10:00 AM on Oct. 1, 2012. The question can be, "As of 10:00 AM, Oct. 1, 2012, how many comments are there for this Facebook® posting?" The verifiers provide their replies based on their inspections of the posting and the expected result is obtained by checking the crawler-obtained data in the data store. Similar questions can be posed for other types of sampled items. The rate of disagreement is analyzed to determine whether the rate of disagreement is statistically significant using the techniques described above. In some embodiments, when the rate of disagreements is statistically significant, the social media items to which the disagreements pertain are further analyzed to identify the cause. For example, these social media items may be classified or categorized to identify specific aspects of the crawler that may have caused the disagreements. For instance, the social media items can be classified into many sub-categories (e.g., posts, comments, re-posts, photo-posts, posts from 3rd party applications, etc.). If the classification results show that most of the disagreements have to do with photos, it is then likely that the photo crawling function of the crawler requires further debugging. Accordingly, feedback information such as the potential cause of the issue is sent to an administrator to facilitate further investigation.

In some embodiments, the verification is used to verify data integrity. For example, the verification question requires the verifier to make an observation based on current data (e.g., "How many comments do you see now for this Facebook® posting?") and a disagreement between the verification result and the expected result may be due to the time lag between the time when the social media item was originally crawled and the time the verification took place, during which additional comments may be posted. In some embodiments, if the rate of disagreement exceeds a predetermined threshold, the crawler re-crawls to refresh data. Further, since re-crawling can be an expensive operation to perform, the need for most up-to-date data should be balanced with the need to reduce resource consumption by reducing the number of re-crawls. In some embodiments, the lag time and whether there is a disagreement are recorded for the samples, and regression analysis is performed on the recorded data to generate a statistical model that predicts the disagreement rate based on lag time. Using this model, a substantially optimal frequency for re-crawling can be determined. For example, the data can be analyzed to determine the pattern of time and frequency of comments (e.g., a posting receives the most comments within the first 28 hours). Based on the pattern, it is determined when the crawler needs to re-crawl in order to ensure that the data is substantially up-to-date (e.g., would result in a disagreement rate that is below a threshold).

In some embodiments, in the event that the rate of disagreement is statistically significant, an administrator is notified of the disagreement rate, any potential cause for the disagreement rate, as well as any recommendations such as how to adjust the frequency the crawler re-crawls.

Information verification of social media data has been described. Crowdsourcing the verification tasks and determining disagreements between the verification results and expected results allow the platform to more quickly and efficiently determine whether data in its data store is up-to-date and accurate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An information verification system, comprising:

one or more processors to:
- present, to a plurality of independent verifiers, a verification task associated with a social media item obtained from a social media-based platform, the verification task being associated with an expected result;
- receive, from the plurality of independent verifiers, a plurality of responses in response to the verification task;
- determine a verification result based at least in part on the plurality of responses;
- determine whether there is a disagreement between the verification result and the expected result; and
- in the event that there is a disagreement between the verification result and the expected result, perform an action in response to the disagreement; and one or more memories coupled to the one or more processors, to provide the one or more is processors with instructions.

2. The system of claim 1, wherein the independent verifiers are humans.

3. The system of claim 1, wherein the verification result is determined based at least in part on a majority of the plurality of responses.

4. The system of claim 1, wherein presenting the verification task includes presenting a link associated with the social media item.

5. The system of claim 1, wherein the verification task pertains to whether the social media item is still present on the social media-based platform.

6. The system of claim 1, wherein the verification task pertains to a number of related actions associated with the social media item.

7. The system of claim 1, wherein the action includes storing information about the disagreement.

8. The system of claim 1, wherein the action includes reloading the social media item from its source.

9. The system of claim 1, wherein:

the verification task is one of a plurality of verification tasks associated with a plurality of social media items, the plurality of verification tasks being associated with a respective plurality of expected results;

the verification result is one of a plurality of verification results associated with the plurality of verification tasks; and the one or more processors are further to determine whether there is a statistically significant rate of disagreements with respect to the plurality of verification results and the plurality of expected results.

10. The system of claim 9, wherein the one or more processors are further to:

determine a statistical model based at least in part on the disagreements with respect to the plurality of verification results and the respective plurality of expected results; and is use the statistical model to determine when to execute a crawler to update the plurality of social media items.

11. A method of information verification, comprising:

presenting, to a plurality of independent verifiers, a verification task associated with a social media item obtained from a social media-based platform, the verification task being associated with an expected result;

receiving, from the plurality of independent verifiers, a plurality of responses in response to the verification task;

determining, using one or more computer processors, a verification result based at least in part on the plurality of responses;

determining whether there is a disagreement between the verification result and the expected result; and in the event that there is a disagreement between the verification result and the expected result, performing an action in response to the disagreement.

12. The method of claim 11, wherein the independent verifiers are humans.

13. The method of claim 11, wherein the verification result is determined based at least in part on a majority of the plurality of responses.

14. The method of claim 11, wherein presenting the verification task includes presenting a link associated with the social media item.

15. The method of claim 11, wherein the verification task pertains to whether the social media item is still present on the social media-based platform.

16. The method of claim 11, wherein the verification task pertains to a number of related actions associated with the social media item.

17. The method of claim 11, wherein the action includes storing information about the disagreement.

18. The method of claim 11, wherein the action includes reloading the social media item from its source.

19. The method of claim 11, wherein:

the verification task is one of a plurality of verification tasks associated with a plurality of is social media items, the plurality of verification tasks being associated with a respective plurality of expected results;

the verification result is one of a plurality of verification results associated with the plurality of verification tasks; and the method further comprises determining whether there is a statistically significant rate of disagreements with respect to the plurality of verification results and the plurality of expected results.

20. The method of claim 19, further comprising:

determining a statistical model based at least in part on the disagreements with respect to the plurality of verification results and the respective plurality of expected results; and using the statistical model to determine when to execute a crawler to update the plurality of social media items.

21. A computer program product for information verification, the computer program product being embodied in a tangible computer readable storage medium and comprising computer instructions for:

presenting, to a plurality of independent verifiers, a verification task associated with a social media item obtained from a social media-based platform, the verification task being associated with an expected result;

receiving, from the plurality of independent verifiers, a plurality of responses in response to the verification task;

determining, using one or more computer processors, a verification result based at least in part on the plurality of responses;

determining whether there is a disagreement between the verification result and the expected result; and in the event that there is a disagreement between the verification result and the expected result, performing an action in response to the disagreement.

* * * * *

UNITED STATES PATENT AND TRADEMARK OFFICE

CERTIFICATE OF CORRECTION

PATENT NO. : 8,914,454 B1
APPLICATION NO. : 13/646534
DATED : December 16, 2014
INVENTOR(S) : Gregory Kroleski It is certified that error appears in the above-identified patent and that said Letters Patent is hereby corrected as shown below:

In the Claims

In Column 8 Line 66, Claim 10, delete “is use the statistical model” and insert --use the statistical model-- therefor.

Signed and Sealed this
Twelfth Day of July, 2016

Michelle K. Lee
*Director of the United States Patent and Trademark Office*